Figure 1:
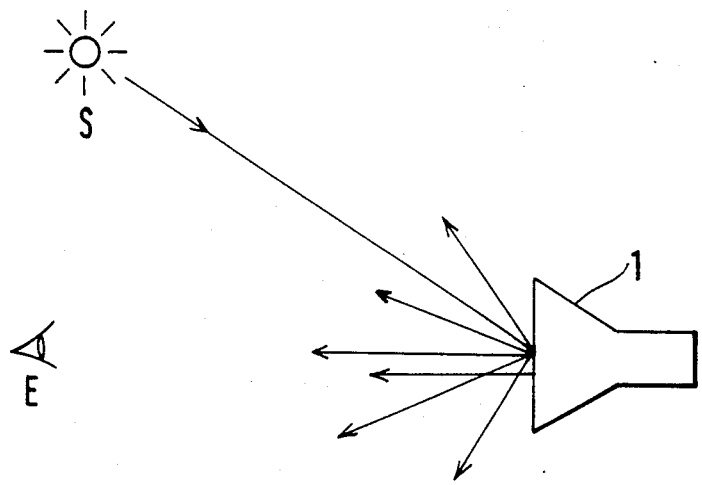

United States Patent [19]

Boyd

[11] Patent Number: 4,582,394
[45] Date of Patent: Apr. 15, 1986

[54] DISPLAY APPARATUS

[75] Inventor: Michael I. Boyd, St. Asaph, Wales

[73] Assignee: Pilkington P.E. Limited, United Kingdom

[21] Appl. No.: 504,580

[22] Filed: Jun. 15, 1983

[30] Foreign Application Priority Data

Jun. 22, 1982 [GB] United Kingdom ............... 8218065

[51] Int. Cl.⁴ .................... G02B 5/32; G02B 27/14; H04N 5/72
[52] U.S. Cl. ........................ 350/174; 350/3.7
[58] Field of Search ............ 350/3.7, 3.72, 3.75, 350/3.83, 174, 169, 171, 172, 3.77; 340/705, 720; 358/252

[56] References Cited

U.S. PATENT DOCUMENTS 3,013,114  2/1958  Bridges .................. 358/252
4,398,799  8/1983  Swift ..................... 350/174

FOREIGN PATENT DOCUMENTS 1574351  2/1977  United Kingdom .

OTHER PUBLICATIONS

"The Lantirn Wide Field-of-View Raster Head-Up Display", Berry et al., Conference, Naecon 1981, Proceedings of the IEEE.

Primary Examiner—John K. Corbin
Assistant Examiner—Bruce S. Shapiro
Attorney, Agent, or Firm—F. Eugene Davis, IV

[57] ABSTRACT

In order to prevent ambient light severely reducing the contrast of a display on a tricolor cathode ray tube, a holographic element having reflection wavelength peaks between the emission wavelength peaks of the cathode ray tube is disposed in the light path from the display to the observer. The holographic plane of reflection is preferably inclined to the substrate plane of the element so as to direct unwanted light away from the observer. The display may be head-down or head-up.

10 Claims, 9 Drawing Figures

DISPLAY APPARATUS

This invention concerns improvements in or relating to display apparatus.

With some display apparatus there is the problem that ambient light incident on a display surface can so reduce the contrast of the display as effectively to wash it out. For example, in an aircraft cockpit a head-up or head-down display can effectively be obliterated, or at least have its contrast drastically reduced, by bright sunlight which shines through the cockpit canopy and is incident on the display surface.

It has previously been proposed in British Patent Specification No. 1,574,351 to alleviate this problem by use of a holographic element which may be a reflection holographic element. It is stated there that a thick reflecting hologram can be readily designed to have a high reflectance over a narrow spectral range coinciding with the wavelength of light emitted by a light-emitting display area, and that specification specifically describes a holographic element having a hologram of the thick film (or volume) phase type arranged such that the element reflects light in the same spectral band as a cathode ray tube screen having a P43 or P44 phosphor, both of which emit green light within a narrow wavelength band. The problem is more complex, however, with a display source which emits light over a plurality of wavelength bands, such as a multi-coloured cathode ray tube (CRT) display. It has been suggested that multilayer deposited coating stack filters can be used for the purpose but there are difficulties in the fabrication of satisfactory such filters.

According to the present invention there is provided display apparatus comprising a display source which emits light over a plurality of wavelength bands having respective emission wavelength peaks, and holographic means disposed in the light path from the display source to an observer, the holographic means comprising a plurality of holograms which reflect light over different respective wavelength bands having spaced respective reflection wavelength peaks, these reflection wavelength peaks being at wavelengths between those of the emission wavelength peaks of the display source.

Preferably the holograms are of the non-conformal type such that the effective plane of reflection is inclined relative to the plane of the substrate on which the hologram is carried.

The holograms may be provided on a common substrate, or there may be a plurality of substrates, each with one or more holograms, possibly arranged as a pack.

The holograms may be constructed by use of a light source located relatively to an element on or in which the hologram is to be formed in substantially the same relative disposition as an observer's eyes will be located relatively to the holographic element in use of the display apparatus, i.e. the light source is located at a position corresponding to the observer's eye position and illuminates the element from the front with a first light beam. A second light beam, e.g. produced by reflection of light transmitted through the element from a mirror backing the element (which mirror may be inclined to produce a correspondingly inclined holographic plane of reflection), illuminates the element from the back and interference between the first and second light beams constructs the hologram. The light source, (alone if an appropriate source is available, or possibly by use of an associated filter means) has spectral emission characteristics corresponding to the required spectral reflection characteristics of the hologram. By making successive exposures with different sources (or a differently filtered source) the plurality of holograms with their respective spectral reflection characteristics can be constructed.

The display source may for example have three emission peaks at respective wavelengths, e.g. may be a multicolour CRT with such peaks provided by three respective phosphors of the CRT. The holographic means may then provide two reflection peaks at respective wavelengths between those of the three emission peaks of the CRT, and may if desired provide one or two further reflection peaks at wavelengths beyond those of one or both of the outer emission peaks of the CRT.

Figure 2:
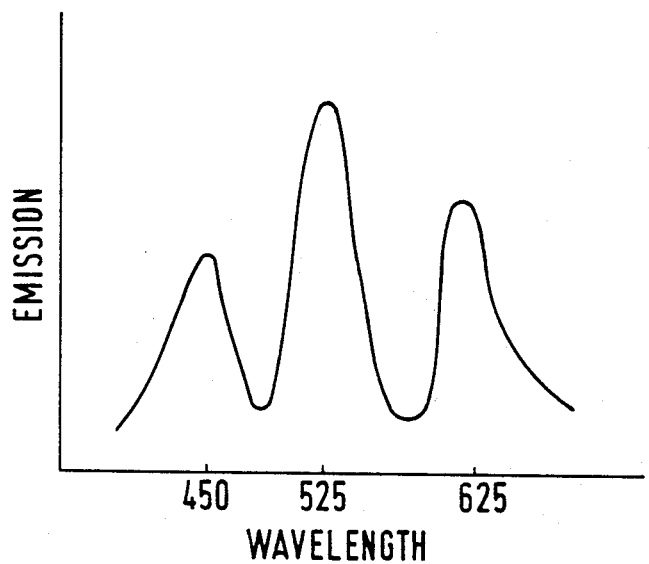
Figure 3:
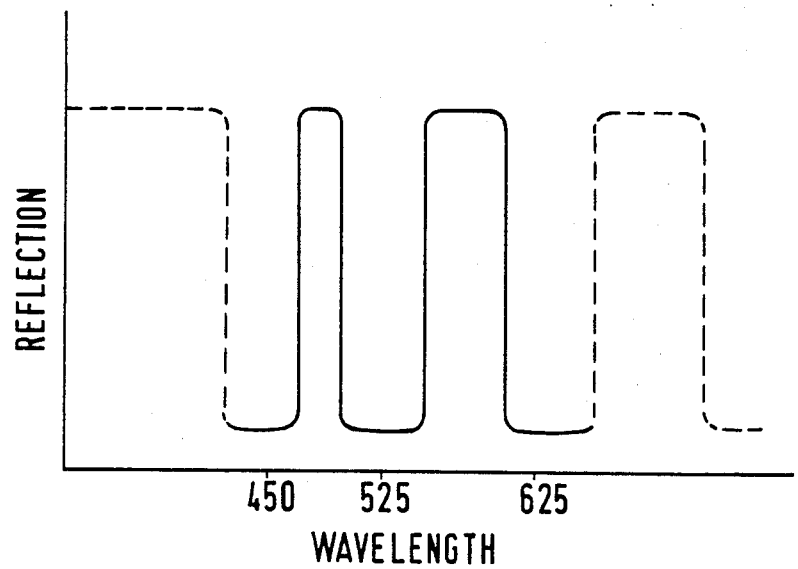
Figure 4:
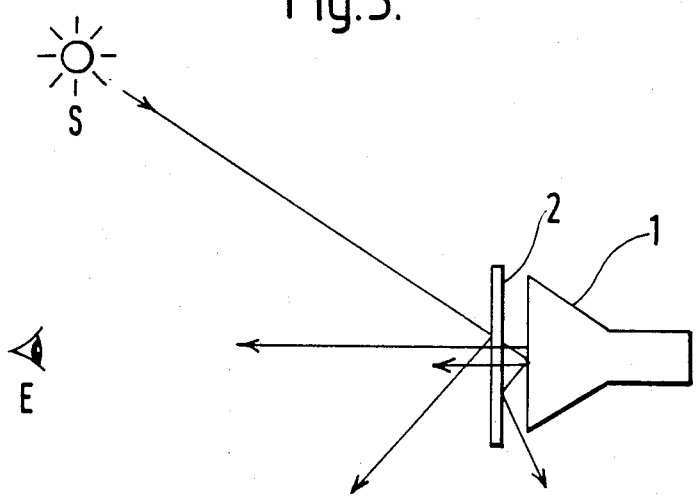
Figure 5:
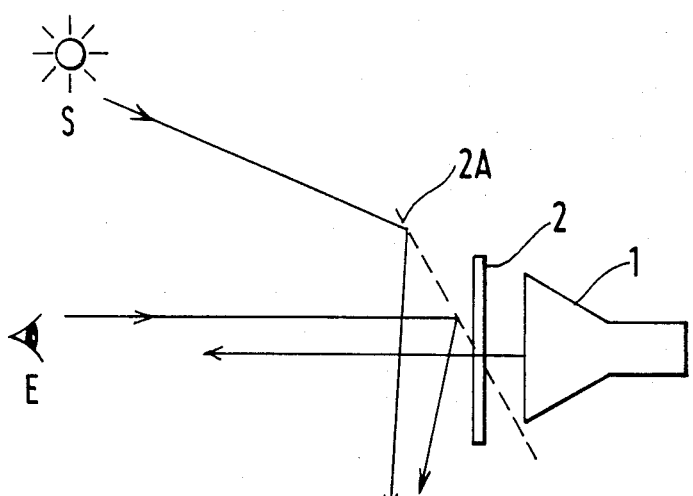
Figure 6:
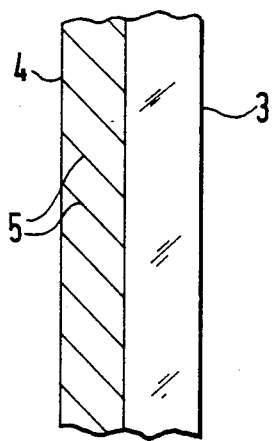
Figure 9:
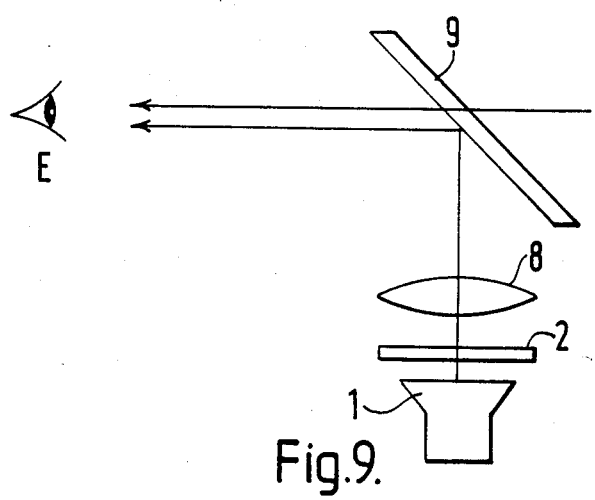
Figure 7:
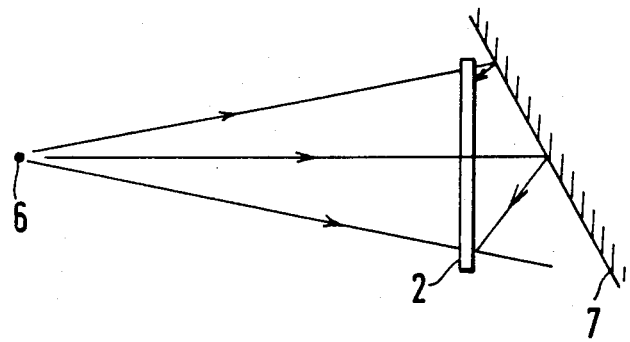
Figure 8:
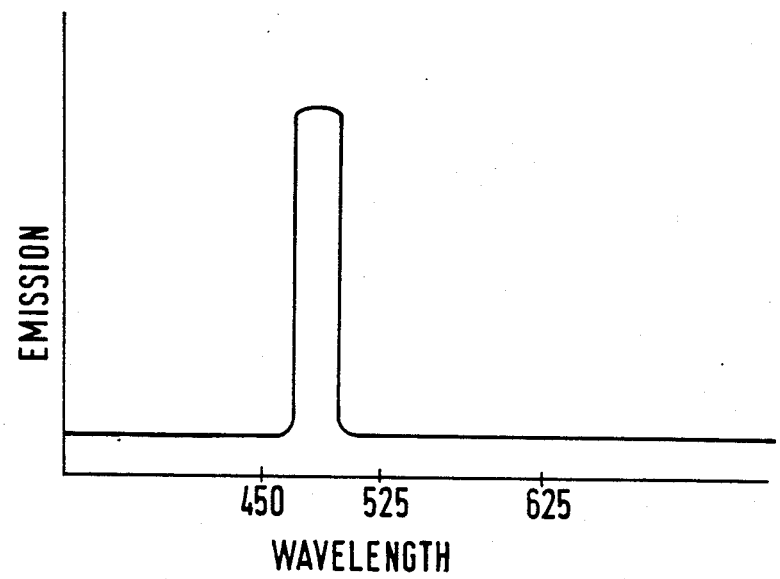

In order that the invention may be better understood, reference will now be, by way of example, to the accompanying drawings in which:

FIG. 1 schematically represents a simple display system,

FIG. 2 represents the spectral output of a typical triphosphor multicolour CRT,

FIG. 3 represents the spectral reflection characteristics of a holographic element for use in accordance with the present invention, FIGS. 4 and 9 schematically represent display apparatus incorporating such holographic element, FIG. 5 schematically represents display apparatus incorporating a preferred form of holographic element, FIG. 6 schematically represents such preferred form of holographic element, FIG. 7 schematically represents an arrangement for constructing a hologram, and FIG. 8 represents the spectral output of a light source used in the arrangement of FIG. 7.

FIG. 1 schematically shows an observer E viewing a display on a CRT 1. Ambient light, for example from the sun S, incident on the CRT faceplate can be reflected therefrom, mainly by diffuse reflection, so as to enter the observer's eyes. Such light reflected from the CRT can significantly reduce the contrast of the display and can effectively obliterate it.

The CRT 1 may be a triphosphor multicolour CRT having a spectral output as schematically illustrated in FIG. 2, i.e. may emit light over three respective wavelength bands having emission peaks at wavelengths of about 450, 525 and 625 nanometers.

FIG. 3 schematically shows the spectral reflection characteristics of a holographic element having two holograms which effect reflection over respective wavelength bands having spaced respective reflection peaks at wavelengths of around 490 nanometers (i.e. approximately midway between the CRT phosphor emission peaks at 450 and 525 nanometers) and around 575 nanometers (i.e. approximately midway between the CRT phosphor emission peaks at 525 and 625 nanometers).

Thus, in effect, the holographic element transmits over respective wavelength bands (represented in FIG. 3 as reflection troughs) corresponding to the emission bands of the CRT, but reflects at wavelengths between those bands.

If desired the element may have two further holograms with respective reflection peaks at wavelengths below 450 nanometers and above 625 nanometers respectively. The spectral reflection curves for such further holograms are indicated in broken line in FIG. 3. It will be understood that these further holograms effectively define the outer boundary of respective reflection troughs (i.e. with high transmission) corresponding to the outer emission bands (having peaks at 450 and 625 nanometers) of the CRT. These further holograms thus have reflection peaks at wavelengths beyond those of the outer emission peaks of the CRT, and their reflection wavelength bands may extend to the respective ends of the visible spectrum.

It will be appreciated that the reflection peaks of the holographic element may in practice be flattened peaks such that the spectral reflection/transmission characteristics approximate to a square wave formation. It will further be appreciated that in practice reflection (or transmission) will generally not be effected with 100% efficiency and that at the reflection peaks some transmission (and at the reflection troughs some reflection) will usually occur.

If a holographic element having the spectral characteristics shown in FIG. 3 is positioned in front of the CRT 1, as shown at 2 in FIG. 4, then light of the wavelengths emitted by the CRT will be largely transmitted through the element to the observer E, who can thereby view the display on the CRT. However, ambient light, for example from the sun, of wavelengths within the bands reflected by the holographic element and incident thereon will be largely reflected thereby so as to prevent or reduce its incidence on the CRT faceplate. Some ambient light, e.g. from the sun, of wavelengths transmitted by the holographic element will be transmitted therethrough to be incident on the CRT faceplate and will be scattered or reflected from the faceplate to be incident on the back of the holographic element. However, at least some of that light will be reflected from the back of the holographic element because of a spectral mis-match between the pass bands at the respective angles of incidence. Other light will travel through the holographic element 2 towards the observer E, but this will generally be very considerably less than would be scattered or reflected from the CRT 1 to the observer E if the holographic element 2 were absent. In this manner, therefore, the contrast of the display can effectively be enhanced by reducing adverse effects of ambient light.

Desirably the effective plane of reflection of the holographic element 2 is so angled as to avoid direct reflection of bright ambient light of relevant wavelengths, e.g. from the sun, from the holographic element to the observer's eyes, and also so that the observer does not see by way of such reflection an image of himself. Such angling of the effective reflection plane can be achieved by appropriately inclining the substrate, but is preferably achieved by constructing the holograms so that the plane of reflection is inclined with respect to the plane of the substrate. This enables the plane of the substrate to be disposed substantially parallel to the CRT faceplate with consequential space saving. The effect is schematically illustrated in FIG. 5 which shows the holographic element planar substrate 2 parallel to the CRT faceplate but the effective plane of reflection 2A (shown in broken line) inclined so that light reflected from the observer's brightly lit face towards the holographic element is not reflected back from the holographic element to the observer's eyes. Also, light from the sun S which might otherwise be reflected directly from the plane of the substrate into the observer's eyes is deviated by reflection downwardly in a direction not towards the observer's eyes by reason of the inclination of the plane of reflection.

Such inclination of the plane of reflection is effected by use of non-conformal holograms. Thus, for example, the holographic element 2 may comprise, as shown in FIG. 6, a glass substrate 3 carrying a layer 4 of gelatin in which the holograms are formed by lines 5 of iso-refractive index inclined with respect to the substrate.

The holograms may be constructed in a manner as schematically illustrated in FIG. 7. A suitable coherent light source 6 is located relatively to the element 2 in substantially the same disposition as the observer's eyes will be located relatively to the element 2 in use in the display apparatus. The element 2 is backed by a planar mirror 7 which is inclined relatively to the plane of the substrate of the element 2 at an angle corresponding to the required inclination of the holographic plane of reflection relative to that substrate. Light from the source 6 is incident as a first beam on the front of the element 2 and also, after transmission through the element 2 and reflection from the mirror 7, as a second beam on the back of the element 2. Interference between these first and second beams at the element 2 (and specifically in the gelatin layer 4) constructs the required reflection hologram.

The source 6, either in itself or by use of an appropriate filter, emits light over a wavelength band corresponding to the required wavelength band for reflection by the respective hologram. Thus the source may for a first hologram have a spectral emission as schematically shown in FIG. 8, i.e. over a wavelength band with a peak (which may be flattened) at or around 490 nanometers corresponding to the reflection wavelength band and peak shown in FIG. 3 between 450 and 525 nanometers. A second hologram may then be constructed with the same optical arrangement but with the light source 6 emitting over a wavelength band with a peak at or around 575 nanometers corresponding to the reflection wavelength band and peak shown in FIG. 3 between 525 and 625 nanometers. Further holograms providing the outer reflection bands and peaks shown in broken line in FIG. 3 may be constructed in the same way with corresponding emission bands for the source 6.

It will be understood that the holographic element 2 may comprise a plurality of holograms in a single holographic medium on a common substrate, or could alternatively comprise a plurality of substrates each with one or more holograms formed thereon, the substrates with their respective holograms in combination providing the required spectral reflection characteristics, for example as shown in FIG. 3. The substrates with their respective holograms may be collected together to form a pack. It will further be understood that the specific wavelength bands and peaks shown and described are given by way of illustration and example, and that other wavelength bands and peak values could be employed, and that the display source could be other than a CRT.

The display system and apparatus shown in FIGS. 1, 4 and 5 in much simplified form could for example be a head-down display, e.g. in an aircraft. In practice, there may be optics associated with the display, e.g. for magnification purposes, so that the system may include optical components such as lenses and/or mirrors via which light travels from the display source to the observer. Thus the observer may in fact view an image of the display. Such image may be located effectively in the plane of the holographic element 2, or such image (or the display source itself) may be located adjacent or displaced form the holographic element. It will further be appreciated that a holographic element as described above, although shown by way of example in FIGS. 4 and 5 as used in a direct viewing mode, could be incorporated in a head-up display in which an observer views the display by way of a combiner which superimposes it on his outside view. FIG. 9 schematically shows such an arrangement in which light from the CRT 1 travels through the holographic element 2 and a collimating lens 8 to the combiner 9 from which it is reflected to the observer E to superimpose the display on the observer's view of the outside scene through the combiner. The holographic element 2 acts as a contrast enhancement filter in a manner as previously described, and the holographic plane of reflection may be inclined relatively to the substrate of the element 2, also as previously described, in order to direct unwanted light away so that it does not travel to the observer.

I claim:

1. Display apparatus comprising a display source which emits light over a plurality of wavelength bands having respective emission wavelength peaks, and holographic means disposed in the light path from the display source to an observer, the holographic means comprising a plurality of holograms which reflect light over a plurality of respective wavelength bands having spaced apart respective reflection wavelength peaks, the said reflection wavelength peaks being at wavelengths between those of the emission wavelength peaks of the display source.

2. Apparatus according to claim 1 in which the holograms are of the non-conformal type such that the effective plane of reflection is inclined relative to the plane of a substrate on which the holograms are carried.

3. Apparatus according to claim 1 in which the holograms are provided on a common substrate.

4. Apparatus according to claim 1 in which the display source has three emission peaks at respective wavelengths.

5. Apparatus according to claim 4 in which the display source is a multicolour cathode ray tube with said emission peaks provided by three respective phosphors of the cathode ray tube.

6. Apparatus according to claim 4 in which the holographic means provides two reflection peaks at respective wavelengths, each reflection peak being between a respective pair of adjacent emission peaks.

7. Apparatus according to claim 6 in which the emission peaks at the largest and smallest of said respective wavelengths define outer emission peaks and in which the holographic means provides one or two further reflection peaks at wavelengths beyond one or both of the outer emission peaks.

8. Apparatus according to claim 1 comprising optical components via which light travels from the display source to the observer.

9. Apparatus according to claim 1, wherein the display apparatus is a head-down display.

10. Apparatus according to claim 1, wherein the display apparatus is a head-up display.

* * * * *